April 17, 1934.　　　A. HENDERSON　　　1,955,584
PLANK CONSTRUCTION SYSTEM
Filed Oct. 24, 1929　　　5 Sheets-Sheet 1

INVENTOR
Albert Henderson
By Byrnes, Stebbing, Parmelee & Blenko
His Att'ys.

April 17, 1934.  A. HENDERSON  1,955,584
PLANK CONSTRUCTION SYSTEM
Filed Oct. 24, 1929   5 Sheets-Sheet 2
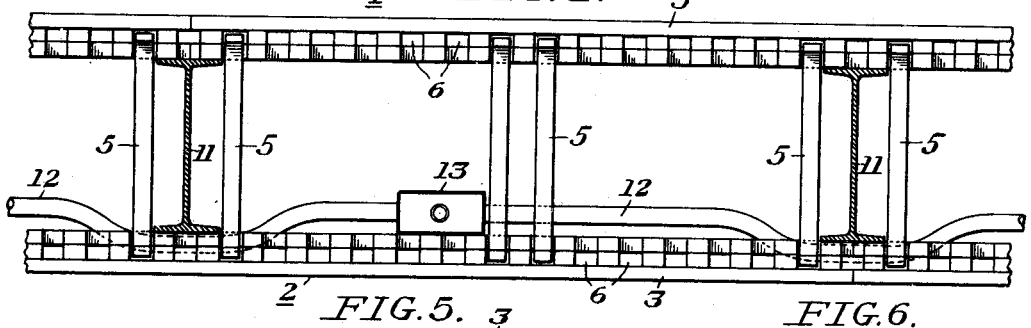
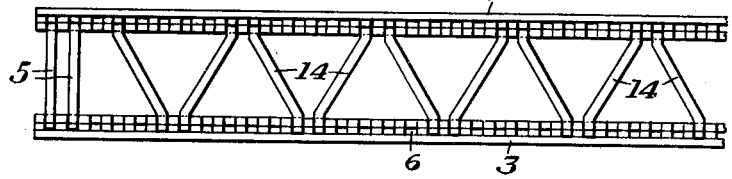
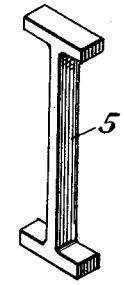
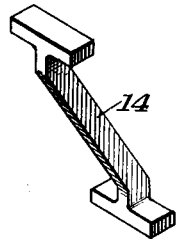
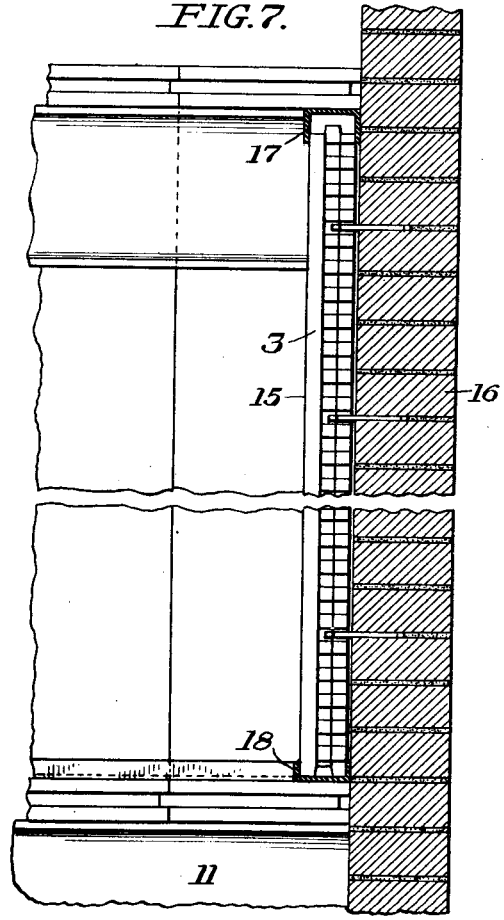
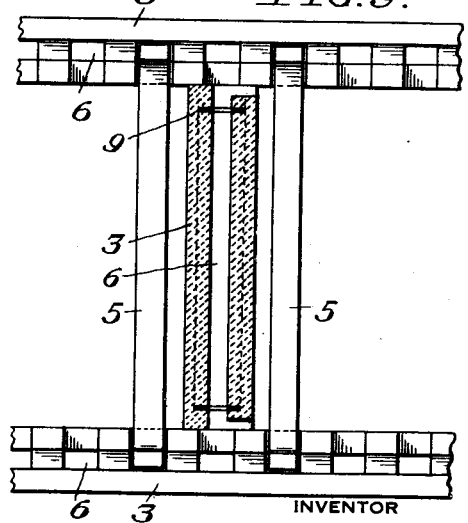
INVENTOR
Albert Henderson April 17, 1934. A. HENDERSON 1,955,584
PLANK CONSTRUCTION SYSTEM
Filed Oct. 24, 1929 5 Sheets-Sheet 3
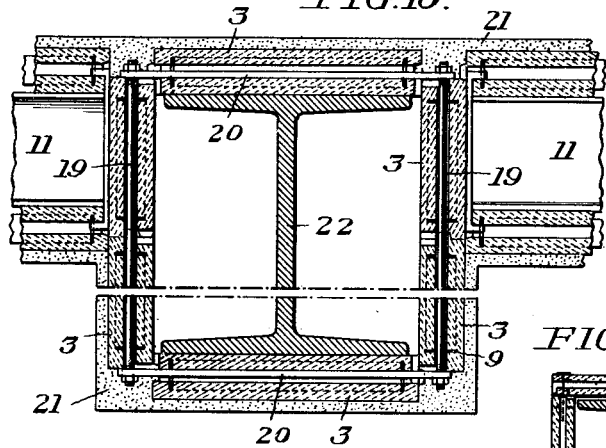
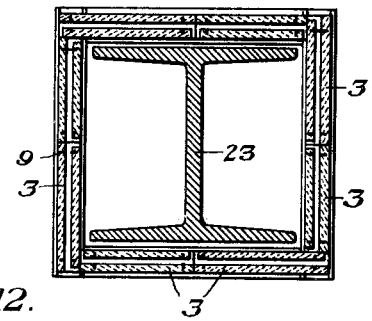
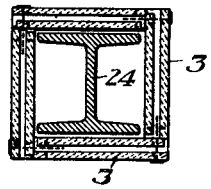
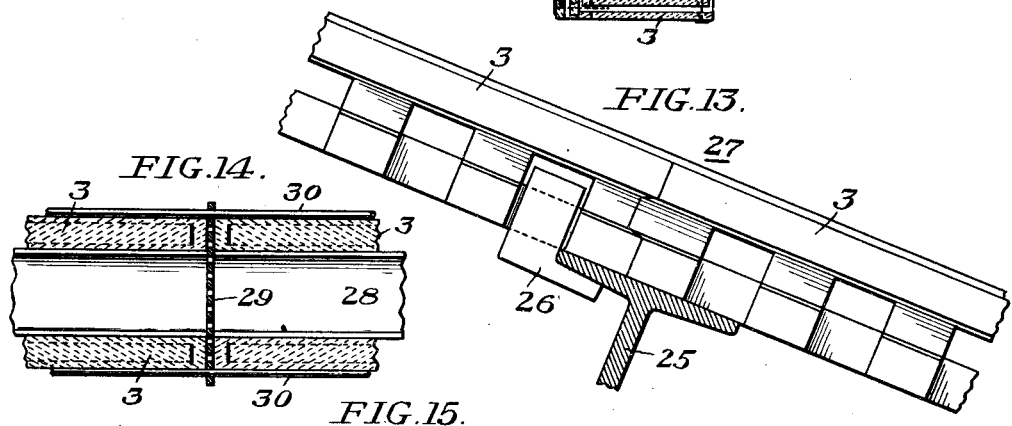
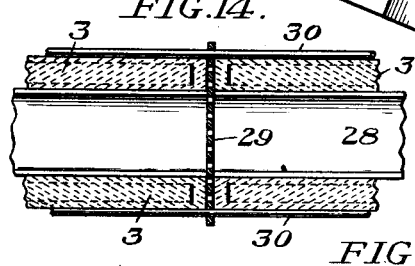
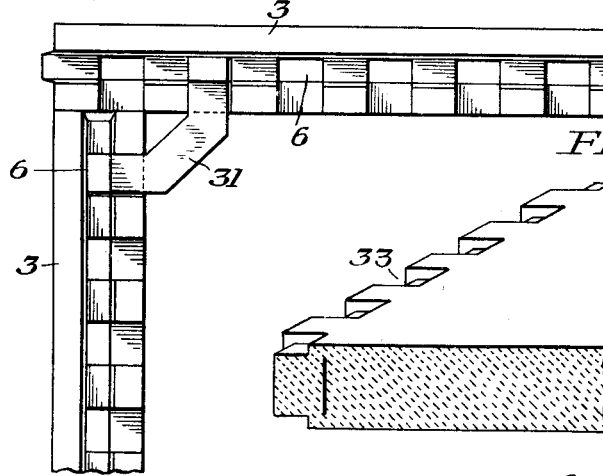
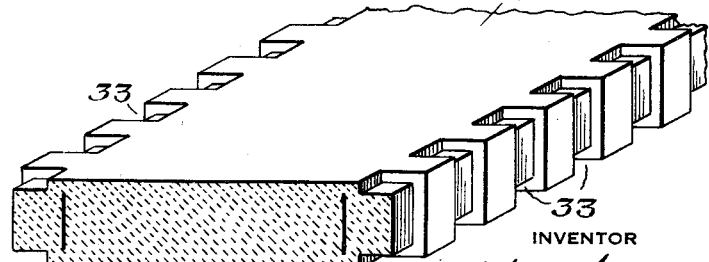

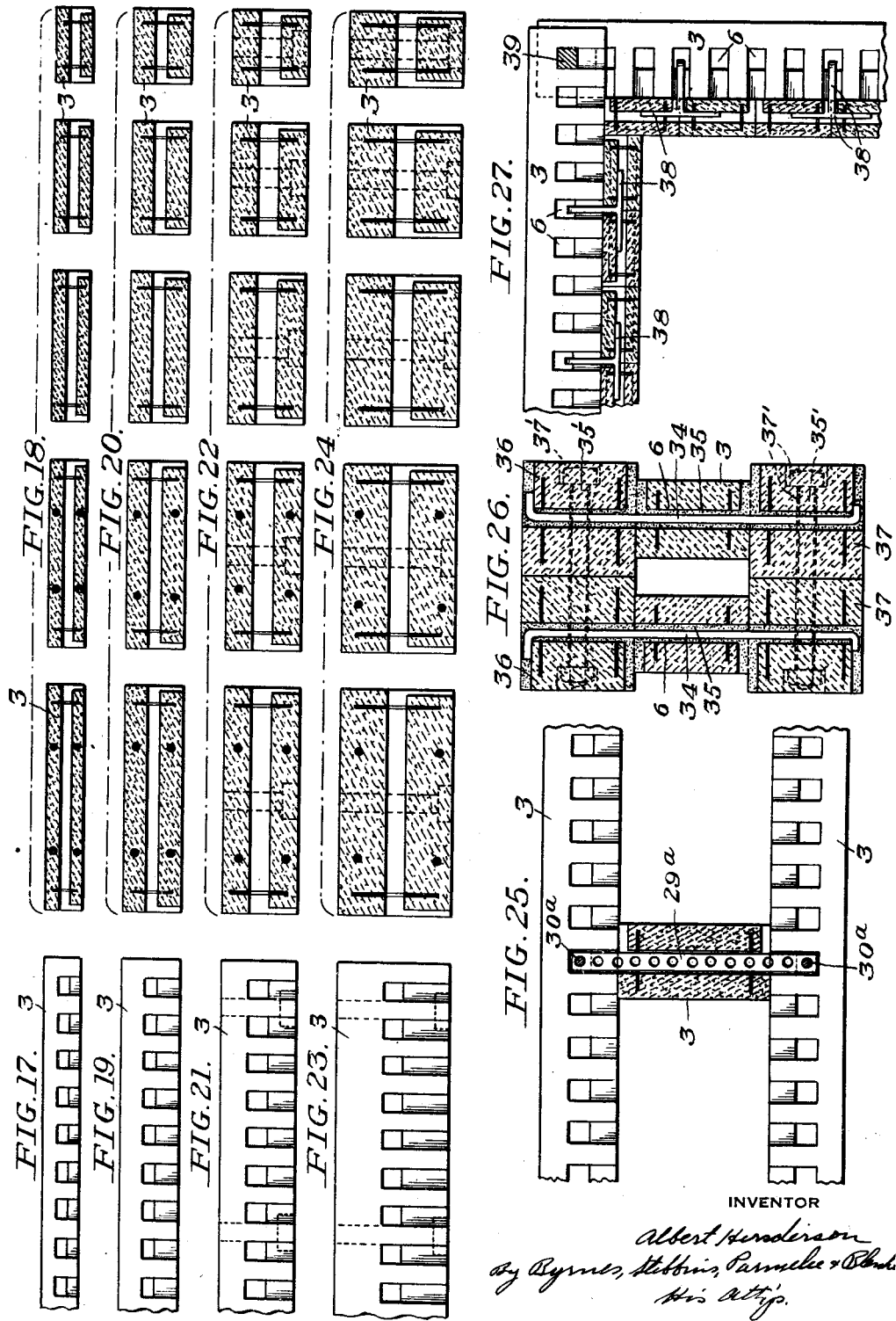

April 17, 1934.  A. HENDERSON  1,955,584
PLANK CONSTRUCTION SYSTEM
Filed Oct. 24, 1929   5 Sheets-Sheet 5
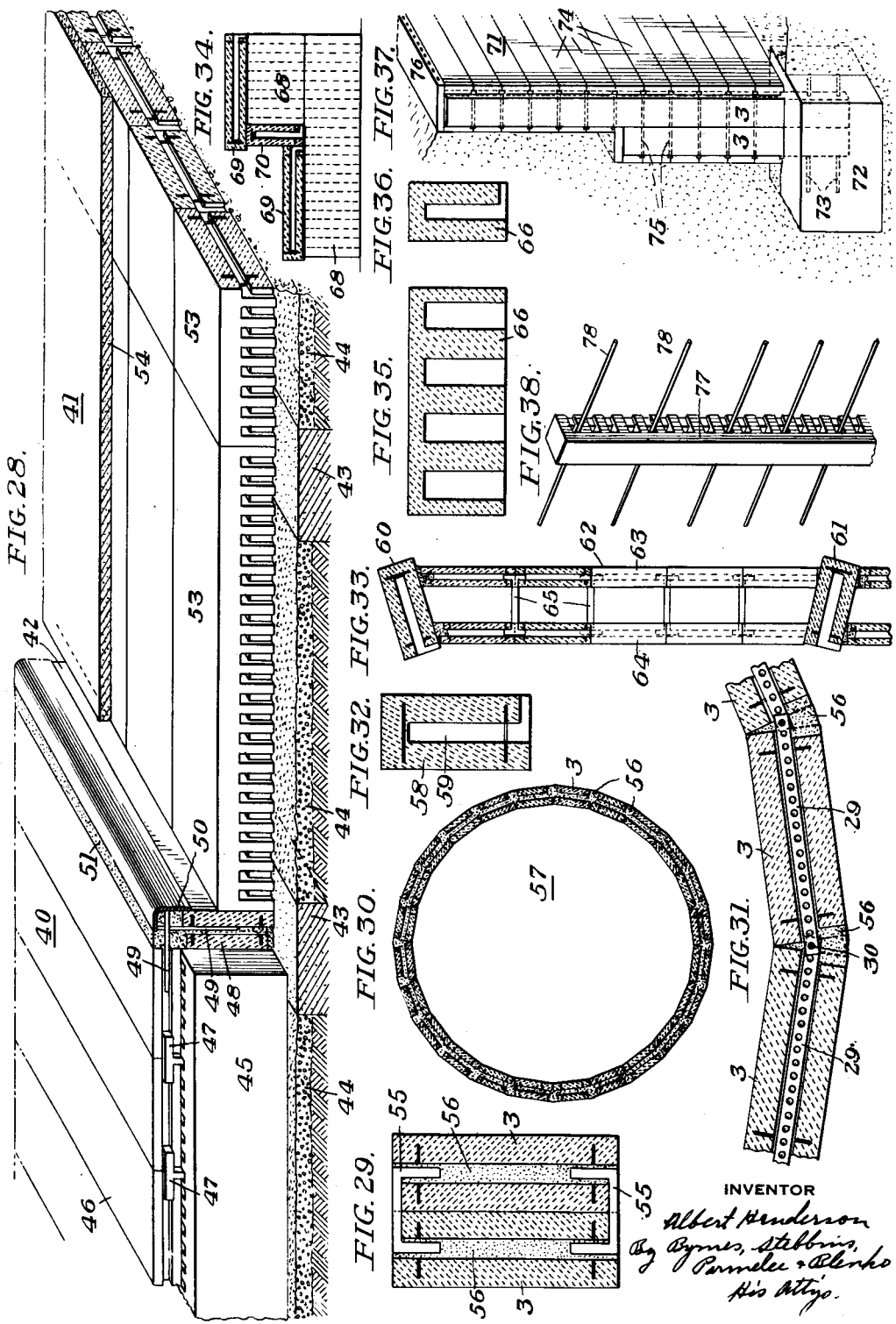

Patented Apr. 17, 1934

1,955,584

UNITED STATES PATENT OFFICE 1,955,584

PLANK CONSTRUCTION SYSTEM

Albert Henderson, Pittsburgh, Pa., assignor of one-fourth to Elverton H. Wicks, Pittsburgh, Pa.

Application October 24, 1929, Serial No. 402,031

21 Claims. (Cl. 72—40)

The present application is a continuation in part of my copending application, Serial No. 394,495, filed September 23, 1929, for Building units, which claims the plank used in the present system, per se, while this application claims the combination thereof with other elements in a building structure.

My invention provides a plank construction system wherein a building, for example, a modern steel fabricated frame, may be entirely covered by the assembly of my pre-cast concrete units. That is to say, the floors, ceilings, wall, girder and column fireproofing and the backing may be constructed by the assembly of my concrete planks.

Sidewalks, streets, steps, fence posts, silos, joists, walls and similar constructions may also be readily made with the utilization of the novel reinforced concrete planks of my invention.

My invention provides a concrete plank construction system comprising a plurality of concrete units that may be joined together without the aid of any cementing material such as mortar.

My invention further provides a plank construction system comprising a plurality of pre-cast concrete planks that are held together by the aid of preformed metallic connecting members.

An important advantage of my plank construction system arises by virtue of the fact that where it is necessary to tear down a construction such as a building constructed in accordance with my construction system, the entire building may be taken apart unit by unit and all of the material salvaged.

Another advantage of my invention arises by virtue of the fact that all of the reinforced concrete planks to be used in a given construction or in any number of different constructions may be manufactured in quantity production at a central plant.

Another advantage arising from my plank construction system lies in the fact that constructions may be made quickly and readily by unskilled laborers, thereby greatly reducing the cost of the construction as compared with constructions built in accordance with prior practice.

The reinforced concrete plank units to be used in my construction system may be manufactured to possess uniform characteristics such as strength and texture which is not possible with prior cast-in-place constructions due to the variation in the skill of the workmen and the non-uniform temperature curing conditions.

My invention will be understood by reference to the accompanying drawings, in which Figure 1 is a cross sectional view of a floor, ceiling and wall construction;

Figure 4 is a plank construction system such as a floor and ceiling or wall;

Figure 5 is a view in side elevation of a plurality of planks connected together by angle members to form a truss;

Figure 6 is a perspective view of a spacing or hanger member;

Figure 7 is a view in side elevation and partially in cross section of an outside wall backup plank construction system;

Figure 8 is a perspective view of a modification of the tie member illustrated in Figure 6;

Figure 9 is a view in elevation and partially in cross section of a joist plank construction system;

Figure 10 is a cross sectional view of a beam or girder fireproofing construction;

Figure 11 is a cross sectional view of a column fireproofed by a plank construction;

Figure 12 is a view similar to Figure 11 of a modification thereof;

Figure 13 is a view in side elevation and partially in cross section of a roof construction;

Figure 14 is an elevational view in cross section of a plank construction system illustrating a modification of means for tying two different layers of planks together;

Figure 15 is a plan view of the corner of a plank construction such as a garage;

Figure 16 is a perspective view of a portion of a modification of the pre-cast concrete plank;

Figure 17 is a view in side elevation of a portion of a pre-cast reinforced concrete plank to be used in my construction system;

Figure 18 is a cross sectional view of a plurality of widths of the plank illustrated in Figure 17;

Figure 19 is a view similar to Figure 17 of a modification of the plank;

Figure 20 is a view similar to Figure 18 of various widths of the plank illustrated in Figure 19;

Figures 21 and 22 are similar to Figures 17 and 18, respectively, showing a modification thereof;

Figures 23 and 24 are similar to Figures 17 and 18, respectively, showing a further modification thereof;

Figure 25 is a view in horizontal section of a wall construction modification;

Figure 26 is a cross sectional view of a column or girder plank construction;

Figure 27 is a plan view, partially in cross section, of a building corner construction modification;

Figure 28 is a perspective view of a sidewalk and road construction of concrete planks;

Figure 29 is a cross sectional view in elevation of a plurality of planks secured together by metal tie members and grouting;

Figure 30 is a cross sectional view of a circular building constructed of vertical concrete planks;

Figure 31 is an enlarged view similar to Figure 30, of a portion thereof;

Figure 32 is a cross sectional view of a modification of the concrete plank;

Figure 33 is a cross sectional view of a wall structure provided with copings for openings;

Figure 34 is a cross sectional view in elevation of a plank step construction;

Figure 35 is a longitudinal cross sectional view of a brick unit formed from a section of the concrete plank;

Figure 36 is a transverse sectional view of the brick shown in Figure 35;

Figure 37 is a perspective view of a portion of a retaining wall constructed of concrete planks; and Figure 38 is a perspective view of a concrete plank used as a fence post.

Figure 1:
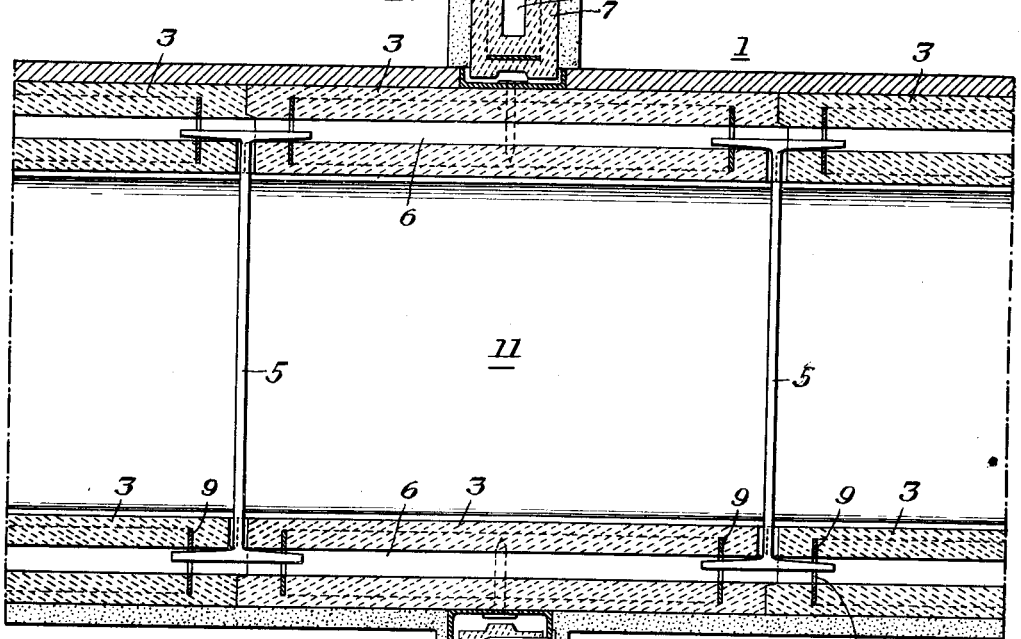
Figure 2:
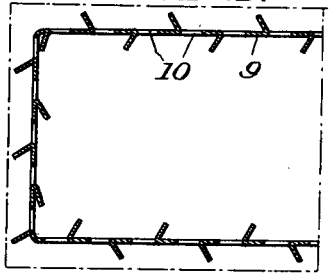
Figure 2 is a cross sectional view of a portion of the reinforcing member cast integral with the concrete to form the plank.
Figure 3:
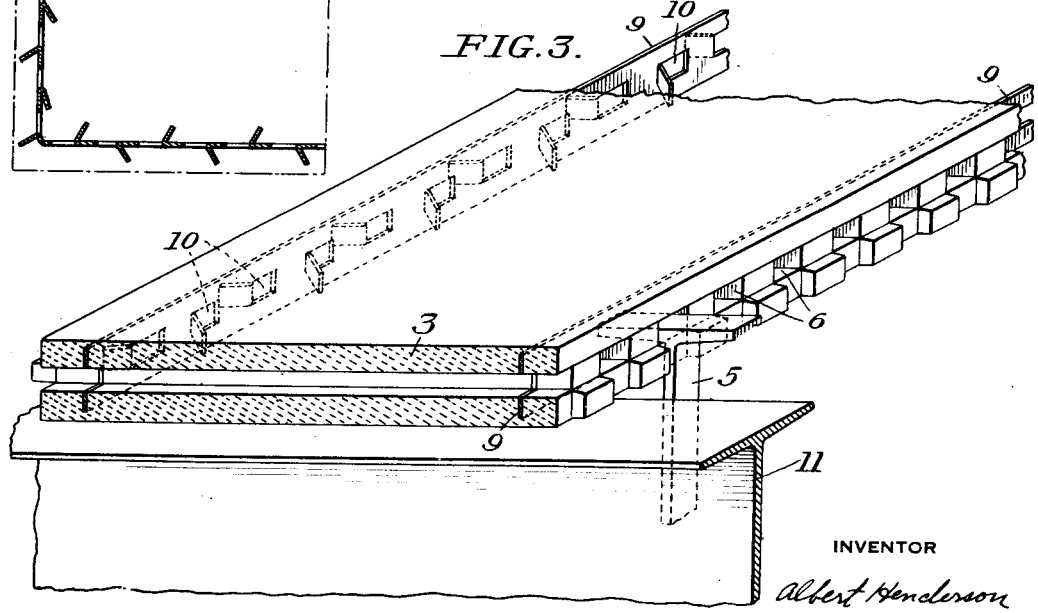
Figure 3 is a perspective view of a portion of the reinforced concrete plank.

The modifications of my invention and the great variety of uses or constructions to which they may be put are graphically represented in the drawings.

Figures 17 to 24 show reinforced concrete planks of various standard thicknesses, each of said planks of standard thickness, having various standard widths thereof that are varied in arithmetical ratio.

The present Underwriters' Code requires a concrete thickness of two inches around all steel columns, girders and the like. This means that walls, floors and ceilings must be at least two inches thick. I therefore use two inches as a standard thickness for the smallest size plank and make the widths of the plank vary by increments of said minimum thickness or two inches. I have provided, as illustrated in Figures 17 to 24, inclusive, a series of planks of various thicknesses and widths in multiples of the standard minimum dimension for concrete fireproofing purposes which, as pointed out above, is now two inches.

The form of the concrete plank illustrated in Figure 17 is two inches thick and of any desired length, the width of this plank as shown in Figure 18 may be made in multiples of two inches, such as four inches, six inches, eight inches, ten inches or twelve inches. The width in each of these cases varies by two inches from the next size width.

In the same manner, the thickness of other planks may be made in any desired thickness that is greater than two inches, for example, three inches (Figure 19), four inches (Figure 21), six inches (Figure 23) and so on. In any event the widths of the planks of various thicknesses are manufactured in multiples of two inches, which is the standard thickness of the smallest plank.

Figures 20, 22 and 24 illustrate how the planks of various thicknesses illustrated in Figures 19, 21 and 23, respectively, may be made in various widths that are multiples of two inches.

The planks of various widths and thicknesses all have parallel equally spaced holes extending from one side to the other thereof. The ends of the openings are aligned with recesses formed in the sides of the plank. The recesses preferably extend from the openings to one only of the surfaces of the plank so that when the planks are joined together a smooth finishing surface is presented on the outside of the construction.

In a modification, openings are provided that extend in the direction of the thickness of the plank. Rectangular openings are preferred to round openings because of the bracing effect that can be transmitted by rectangular tie members coacting with the sides of the rectangular openings. In the case of round openings, a round tie member positioned in the opening would be incapable of transmitting any bracing forces about the axis of the opening.

The openings are positioned in the plank parallel to and between the upper and lower surfaces of the plank, so that the latter is lightened in weight without reducing its strength or ability to carry loads.

Referring particularly to Figure 1, there is illustrated a floor system comprising a floor 1 and a ceiling 2 made up of a plurality of reinforced precast concrete slabs or planks 3. Hangers 5 of substantially I-shape are positioned in the holes 6 of the planks for the purpose of holding them together. An upper partition plank 7 may be mounted on the floor 1 and a lower partition plank 8 may be secured to the ceiling 6. In this connection, it is to be noted that a single layer of my improved planks may be used to form an entire partition or wall.

A reinforcing strip 9 is embedded within the plank near the edge thereof, that is provided with rectangular openings 10 corresponding in size, shape and location to the openings 10 extending through the plank.

It will be noted that the reinforcing strip 9 is positioned sufficiently close to the periphery of the plank so that the flanges of the hangers coact therewith to increase the strength of the assembled construction.

In the construction illustrated in Figure 1, the floor and ceiling planks may be laid, respectively, above and below a steel I-beam or girder 11.

Referring to Figure 4, there is illustrated a plank construction that may either be a floor or a wall system. In this connection an electric conduit 12 having an outlet box 13 may be associated with the construction as shown. If the construction illustrated in Figure 4 is a floor system, the conduit 12 is run through the ceiling plank. Incidentally, Figure 4 may be taken as a view in side elevation of the construction illustrated in Figure 1. It will be observed that additional hangers 5, 5 may be placed in the space between the supporting steel beams 11.

Where the structure illustrated in Figure 4 is used as a floor system, the ceiling planks help the floor planks carry any burden placed upon them, strains being transmitted through hangers 5. The planks are preferably staggered when used in a floor system so that when a floor finish or plaster is used, there will be little likelihood of cracking along the line of the supporting steel beams. In some cases, as in a floor system, the ceiling and floor planks may be made with a special finish so that no additional finish need be applied after the planks have been assembled.

Figure 5 illustrates a plurality of planks 3, 3 tied together by hangers 5 and 14 to form a truss. The offset hangers 14 increase the strength of the resulting truss.

Figures 6 and 8 show modifications of the hangers or spacing members, the heads of which are driven into the plank openings, making a tight fit. Since the sheet metal reinforcing strip openings are of the same size as the holes in the plank, a steel to steel connection results between the reinforcing strip and the flange of the hanger. In cases where a connecting member smaller than the opening is used, mortar may be introduced in the opening to hold the connecting member in position.

Figure 7 illustrates a plank backup construction 15 for outside walls 16. In this case the plank 3 is secured to the wall 16 by means of top and bottom channels 17 and 18, respectively. The backup structure 15 is somewhat similar to a wall partition and in some cases may be used as such.

Figure 9 illustrates how a plank 3 may be used as a joist, either in a wall or a floor structure. The structure illustrated in Figure 9 is similar to that illustrated in Figure 1, with the exception that the steel I-beam is replaced by the reinforced concrete plank 3. The hangers 5 are positioned on either side of the joist to connect the upper and lower planks 3, 3 together.

Figure 10 illustrates how the plank may be assembled around a beam or girder for fireproofing purposes. The planks 3 may be positioned around the beam 22 as shown and held in position by bolts 19 and straps 20 passing through the openings in the plank as shown. A layer 21 of plaster or cement may be used to finish off the surface on the outside of the planks 3.

As shown in Figure 11, a column 23 may be fireproofed by means of eight of the planks. In this case, the planks are secured at their bottoms to the channels embedded in the floor and at their tops to the channels embedded in the ceiling in a manner similar to that illustrated and described above in connection with the partitions and backup structure. Clamping means similar to that shown in Figure 10 may be used in the middle of the planks to insure their rigidity. The material forming the concrete plank may be, and preferably is, in some cases, nailable.

As shown in Figure 12, a smaller column 24 may be fireproofed by nailing four planks together as shown, or by tying their tops and bottoms together similar to that described above in connection with Figure 11.

A roof construction may be made of the planks 3 in the manner shown by laying the planks on a steel purlin 25. A specially shaped steel clip 26 is used for preventing the roof 27 from sliding on the top of the girder 25. The clip 26 has a portion that extends into the opening of the upper plank 3 and a portion that extends under the flange of the girders 25 as shown. The clip 26 secures the roof 27 to the girder 25.

As shown in Figure 14, two planks separated by a steel I-beam 28 may be tied together between their joints by a perforated metallic strip 29 and rods 30. The metallic strip 29 is made in a single long piece and is cut into any desired length, depending upon the thickness of the I-beam 28.

As shown in Figure 15, a building such as a garage may be constructed of the concrete plank by joining the ends of the plank 3 by a steel angle member 31 that fits into the openings in the members and joins them together securely in the manner shown. The angle member 31 is provided with right angle portions that are driven into the openings 6 in the ends of the member 3.

A modification of the reinforced concrete plank is illustrated in Figure 16. Here the plank 32 is provided with a plurality of recesses 33 cut in the sides and upper and lower surfaces of the plank as shown. The recesses 33 are preferably spaced equal distances apart along the sides of the plank.

As described above, Figures 17 to 24 inclusive illustrate various modifications of the reinforced concrete plank, the widths thereof varying in multiples of the thickness of the smallest standard plank. The planks illustrated are provided with equally spaced openings extending from one side of the plank to the other. The sides of the plank are recessed as shown and described above.

As shown in Figures 21 to 24, inclusive, the plank may also be provided with spaced vertical openings extending therethrough in the direction of the thickness thereof.

As shown in Figure 25, a wall structure may be made by planks arranged as shown and tied together with a perforated metallic tie member 29ª that extends through a horizontal opening in the vertical plank and coacts with rods 30ª positioned in vertical openings of the side planks and extending through the corresponding openings in the metallic bar 29ª. The pins or rods 30ª may be embedded in the openings in the side planks by means of grouting or mortar. In this construction the inner and outer planks are firmly tied together and coact with each other when placed in either tension or compression through the instrumentality of the metallic bar 29ª and the pins 30ª.

As shown in Figure 26, a column or girder may be formed by assembling various sizes of planks as shown and tying them together by means of rods 34 extending through the openings and cemented therein by means of grouting or other similar material 35. The ends of the rods 34 are bent over as shown to form a stable structure. In this connection, it will be noticed that the corresponding openings in the plank are utilized to hold the completed structure together in assembled relation, the rod 34 passing through all of the corresponding openings in the various planks.

The rods 34 are provided with one bent end that may be longer than the sides of the openings, but slightly shorter than the diagonal of the openings, so that the end may be dropped diagonally therein and then twisted, the rod extending over the edge of the opening. The other end of the rods may, of course, be longer than the diagonal of the openings, since it does not need to be passed therethrough.

Bolts 35' may be used to secure the groups 36 and 37 together. In this connection, it is to be noted that the upper and lower planks of this particular structure are provided with openings 37' that extend across the plank at right angles to the normal openings 6.

As illustrated in Figure 27, planks of the different sizes, some horizontal and some vertical, may be assembled together as shown by means of steel tie members 38 that are provided with a T-shaped flange extending in the described manner in the openings of the smaller vertical plank and with a right angled portion extending into the openings of the larger horizontal plank as shown. The structure illustrated in Figure 27 may be the corner of any square structure such as a bin, flume or garage. A rectangular steel rod 39 may be inserted in the alined openings through the angularly related large planks.

A sidewalk 40 and a roadway system 41 including the conventional curb 42 may be constructed of my reinforced concrete plank in the manner illustrated in Figure 28. Suitably spaced reinforced concrete foundations 43 are first provided in the bottom of the road bed extending in the direction thereof and the space between them is filled to a level with their surface by a layer 44 of sand, gravel, grouting or other similar material.

The sidewalk is formed by first laying a series of spaced concrete planks 45 on edge, the ends of the planks resting on the foundations 43. A second layer of plank 46 is then laid on top of the initial layer of plank 45 to form the surface of the sidewalk 40. Steel angle members 47 may be used to hold the planks 45 and 46 in proper assembled relationship.

The curb 42 comprises a plank 48 that is laid on the corresponding concrete foundation 43 so that its inner side is flush with the ends of the layer of planks 45 forming the foundation of the sidewalk 40. Steel tie rods 49 may be disposed in the openings of the end plank of the sidewalk and the curb plank 48. A conventional metallic angle 50 for the corner of the curb may be positioned and held in place by concrete or grouting 51. The projecting ends of the rods 49 and the channel member 50 may be welded to form an integral structure.

The road bed is formed in a similar manner by laying a layer of planks 53 on the foundation 43. The surface of the layer of planks 43 may be covered by any suitable street-surface material 54 such as asphalt to prevent wearing and cracking of the planks 53.

It is apparent that this construction is far superior to prior constructions in that it may be more readily laid and removed for laying conduits below the surface of the street. It is well known that public service companies and the like are continually tearing up city streets for the purpose of laying or relaying electric, gas and water conduits. My present street covering, being so readily removable and replaceable, results in a great saving to the community.

A plurality of reinforced concrete planks may be secured together to form a unitary structure in the manner illustrated in Figure 29 by inserting channel sections 55 into the openings of the plank and cementing the same therein by means of grouting 56 or similar cementing material. Such construction results in a plank member that is very strong and rigid.

Referring to Figures 30 and 31, a circular building 57, for example, a stack, bin, silo or sewer, may be constructed with the reinforced concrete plank by placing the planks side by side to form a circle. The planks are secured together with perforated metallic strips 29 that are disposed in the opening through the plank. Pins 30 may be dropped through corresponding openings in adjacent strips to hold the same together. Grouting or mortar 56 may be used to fill up the wedge-shaped opening between the sides of the plank and to cement the ends of the strips 29 and the pin 30 in integral relationship.

Circular buildings of any size may be constructed in this manner and the only necessary fitting to be done is the cutting off of the metal tie strips 29 to convenient lengths.

A modification of the concrete planks adaptable for use in forming a building where coping and sills for openings are required is formed as illustrated in Figures 32 and 33 by a plank 58 having a recess 59 therein that extends from the inside of the plank and around one of the tongues formed thereby. Similar recesses are provided in the plank in the manner described above in connection with the other modification of the plank.

The modification of the blank illustrated in Figure 32 may be used for a coping 60 and a window or door opening sill 61 in the wall 62 constructed of two spaced layers of reinforced concrete planks 63 and 64 that are held together by I-shaped tie members 65.

Short sections of my plank may be cut off to form a brick 66 as shown in Figures 35 and 36.

A flight of steps may be constructed of my concrete planks by placing certain of them on edge to form the cheeks 68. Wide planks are used as treads 69 and a plank of shorter width is used as a riser 70.

Figure 37 illustrates a plurality of reinforced concrete planks assembled together to form a retaining wall 71. This construction may be conveniently made by placing a plurality of planks 3 in spaced relationship then casting a solid block 72 of concrete around the base of the post formed thereby to form a supporting foundation therefor.

Metallic reinforcing rods 73 extending through the lower openings of the plank may be used to reinforce the structure and hold the post in position. The wall may then be formed by outside layers of horizontal planks 74. These planks are secured together by tie rods 75 extending through the openings from one side to the other of the post and into the recesses in the surface forming planks 74. A plank 76 may be laid on top of the wall to provide a finishing surface for the same.

The space between the outer surfaces of the wall may be filled by dirt or other excavated material, if desired.

A wall constructed in this manner may be used not only as a retaining wall, but also as a solid fence for enclosing industrial areas.

Referring to Figure 38, my concrete plank may be used as a fence post 77, vertically spaced wires 78 of the fence being passed through the openings, as shown. The construction illustrated in Figure 38 may also be used for other types of vertical supporting structures, such as telegraph and telephone poles and the like.

My present construction system provides means whereby a building may be constructed entirely of concrete plank without the aid of mortar or other cement material for example, like that illustrated in Figure 7. Referring again to Figure 7, a box-like structure such as the room of a building may be constructed by forming all of the sides of the same size reinforced concrete plank and if necessary such a room could be made up entirely of similar units of similar cross section tied together in the manner disclosed without the aid of mortar. This is a very important feature in building construction inasmuch as the material can be salvaged. It is also very inexpensive to assemble.

The advantage of having the openings properly positioned in the plank, is that the plank is not thereby weakened, but is lightened and improved by increasing its adaptability for being readily and firmly connected to a similar plank or to a supporting member.

While I have disclosed preferred embodiments of my invention, it will be understood that the invention is not limited thereto nor to the particular number and form of the units shown, as it may be otherwise embodied within the scope of the appended claims.

I claim:

1. In a building construction, the combination with a plurality of precast planks of different dimensions, each plank having a plurality of transverse holes from edge to edge thereof, the edges of said planks adjacent said holes being recessed, the transverse holes in planks of different dimensions being equally spaced and of the same dimensions.

2. A building construction comprising a plurality of precast fireresisting planks having transverse holes therethrough, and reinforcing members extending across said holes, said members being perforated to provide continuous openings through said planks, said planks having different dimensions, the holes in planks of different dimensions being equally spaced.

3. In a building construction, intersecting walls formed from fireproof planks each having a series of transverse holes and a series of recesses on one side, a metal tie seated in a hole and recess of one plank likewise engaging a similar plank at a corner of the building.

4. In a building construction, a plurality of reinforced fireproof planks having transverse holes through their width forming a wall of the building, the holes through said planks traversing the reinforcement therein, and a metal tie for securing said planks together having flanges adapted to enter the holes in the planks and the reinforcement to bring the metal tie and the reinforcement into intimate contact.

5. In a building construction, a metal frame having horizontal members, an enclosure for said members comprising a series of fireresisting planks above and below said members, and means detachably engaging the planks whereby the lower series are supported by the upper series.

6. In a building construction, the combinaton with a plurality of fireresisting planks having recessed edges and transverse holes opening into said edges, of means seated in said recesses and holes for securing said planks together.

7. In a building construction, the combination with a plurality of fireresisting building units having recessed edges and transverse holes opening therein, of means seated in said recesses and holes for detachably securing said units together to provide a knockdown building construction.

8. A building construction comprising a floor and a wall on said floor, the floor and wall comprising abutting similarly shaped fireresisting planks, said wall being formed of a single layer of abutting vertically extending planks secured at their lower ends to the floor planks.

9. In a building construction, the combination with a metal frame, of a roof comprising abutting fireresisting planks having recesses and holes therethrough, and metal ties engaging said metal frame and seated in the holes and recesses in said plank.

10. A building construction comprising a floor and a ceiling, partition walls extending therebetween, channels on said floor and ceiling for receiving the ends of said partition walls, said planks being in one piece and of such length as to extend substantially from floor to ceiling yet slightly shorter than the ceiling height whereby they may be inserted in the ceiling channel and dropped into the floor channel.

11. A building construction comprising a floor and a wall on said floor, the wall being formed of a single horizontal layer of abutting, vertically extending, fire-resisting planks secured at their ends to said floor, said planks coacting with an external veneering.

12. A building construction comprising a floor, a ceiling and an external wall, the backing of said wall comprising a single horizontal layer of abutting, vertically extending, fire-resisting planks secured at their lower ends to said floor and their upper ends secured to said ceiling.

13. A building construction comprising a floor, a ceiling and metal beams therebetween, the floor and ceiling being separately made up of abutting, staggered, jointed, fire-resisting planks of similar shape which run continuously over and under said beams so that cracking of the field applied surface of said planks is avoided.

14. A building construction comprising a floor, a ceiling with a wall and metal column enclosure resting on said floor and reaching to said ceiling, the floor, ceiling, wall and metal column covering being formed of similarly shaped, fire-resisting planks, and the wall and column enclosure being made up of abutting, vertically extending planks secured at their ends to said floor and said ceiling.

15. A structural unit comprising a precast plank, metallic reinforcing strips having spaced rectangular holes therein embedded in the slab parallel to its edges and spaced inwardly thereof, and a plurality of transverse holes extending the width of the plank, alined with the holes in said strips.

16. As an article of manufacture, a building unit comprising a precast fireproof plank having a plurality of holes extending across the plank, and reinforcing strips embedded in the unit longitudinally thereof, having perforations alined with said holes.

17. An article of manufacture comprising a fireproof plank having a groove in one of its edges, a series of transverse holes through the plank terminating in the bottom of said groove, one wall of said groove being notched adjacent the end of said holes.

18. An article of manufacture comprising a fireproof plank having grooves in its edges, transverse holes through the plank terminating in the bottoms of said grooves and equally spaced longitudinally of the plank, and recesses in one wall of said grooves adjacent the ends of said holes.

19. An article of manufacture comprising a fireproof plank having grooves in its edges, a plurality of transverse holes through the plank terminating in the bottoms of said grooves and being spaced apart longitudinally of the plank a distance equal to the width of the holes, and recesses in one wall of said grooves adjacent the ends of the holes.

20. An article of manufacture comprising a fireproof plank having grooves in its edges, a plurality of holes extending through the plank and terminating in the bottoms of said grooves, and recesses formed in the wall of said grooves adjacent a common face of the plank, in alinement with said holes.

21. An article of manufacture comprising a fireproof plank having reinforcing strips embedded therein adjacent its edges, a plurality of holes extending transversely through the plank, said strips having punched out portions forming openings in the strip in alinement with said holes, the punched out portions of the strips being bent back to effect a bond with the plank material.

ALBERT HENDERSON.